United States Patent
Kim et al.

(10) Patent No.: US 9,425,461 B2
(45) Date of Patent: Aug. 23, 2016

(54) REJUVENATION OF AUTOMOTIVE FUEL CELLS

(71) Applicant: Los Alamos National Security, LLC, Los Alamos, NM (US)

(72) Inventors: Yu Seung Kim, Los Alamos, NM (US); David A. Langlois, Los Alamos, NM (US)

(73) Assignee: LOS ALAMOS NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 14/255,847

(22) Filed: Apr. 17, 2014

(65) Prior Publication Data

US 2015/0303497 A1    Oct. 22, 2015

(51) Int. Cl.

| H01M 8/04 | (2016.01) |
|---|---|
| H01M 4/86 | (2006.01) |
| H01M 2/00 | (2006.01) |
| H01M 4/92 | (2006.01) |
| H01M 8/10 | (2016.01) |

(52) U.S. Cl.
CPC ............ *H01M 4/8673* (2013.01); *H01M 2/00* (2013.01); *H01M 4/8626* (2013.01); *H01M 4/92* (2013.01); *H01M 8/04223* (2013.01); *H01M 8/04238* (2013.01); *H01M 2008/1095* (2013.01)

(58) Field of Classification Search
None
See application file for complete search history.

(56) References Cited

U.S. PATENT DOCUMENTS

| 6,858,336 | B2 | 2/2005 | Reiser et al. | |
|---|---|---|---|---|
| 7,270,904 | B2 | 9/2007 | Yu et al. | |
| 7,608,352 | B2 | 10/2009 | Yu et al. | |
| 7,713,650 | B2 * | 5/2010 | Reid | 429/535 |
| 2012/0028154 | A1 * | 2/2012 | Owejan et al. | 429/434 |

FOREIGN PATENT DOCUMENTS

| JP | 2001332281 A | * | 11/2001 |
|---|---|---|---|
| JP | 2002208421 A | * | 7/2002 |
| WO | WO 2010093240 A1 | * | 8/2010 |
| WO | WO 2011149732 A2 | * | 12/2011 |

OTHER PUBLICATIONS

J-PlatPat Machine Translation of the detailed description of JP 2001-332281A (Nov. 2001).*
J-PlatPat Machine Translation of the detailed description of JP 2002-208421A (Jul. 2002).*
Alberti, et al, "Effects of hydrothermal/thermal treatments on the water-uptake of Nafion membranes and relations with changes of conformation, counter-elastic force and tensile modulus of the matrix," Journal of Power Sources, 2008, vol. 178, pp. 575-583. Available online Sep. 18, 2007.
U.S. Drive Fuel Cell Tech Team, Fuel Cell Technical Team Roadmap Contributors: Argonne National Laboratory, Chrysler Group LLC, Ford Motor Company, Gneral Motors, Los Alamos National Laboratory, U.S. Department of Energy, Fuel Cell Technologies Office, Last Revision Jan. 14, 2013, 30 pages.
Collette, et al., "Structure and transport porperties of solution-cast Nafion membranes subjected to hygrothermal aging," Journal of Membrane Sciences, 2013, vol. 435, pp. 242-252.
Kim, et al., "Highly durable fuel cell electrodes based on ionomers dispersed in glycerol," Phys. Chem. Chem. Phys. 2014, vol. 16, pp. 5927-5932.
Park et al., "Increased water retention in polymer electrolyte membranes at elevated temperatures assisted by capillary condensation," Nano Letters, 2007, vol. 7, No. 11, pp. 3547-3552.

* cited by examiner

*Primary Examiner* — Gregg Cantelmo
(74) *Attorney, Agent, or Firm* — Lewis Roca Rothgerber Christie LLP

(57) ABSTRACT

A process for rejuvenating fuel cells has been demonstrated to improve the performance of polymer exchange membrane fuel cells with platinum/ionomer electrodes. The process involves dehydrating a fuel cell and exposing at least the cathode of the fuel cell to dry gas (nitrogen, for example) at a temperature higher than the operating temperature of the fuel cell. The process may be used to prolong the operating lifetime of an automotive fuel cell.

10 Claims, 5 Drawing Sheets

REJUVENATION OF AUTOMOTIVE FUEL CELLS

STATEMENT REGARDING FEDERAL RIGHTS

This invention was made with government support under Contract No. DE-AC52-06NA25396 awarded by the U.S. Department of Energy to Los Alamos National Security, LLC, for the operation of Los Alamos National Laboratory. The government has certain rights in the invention.

FIELD OF THE INVENTION

The present invention relates generally to fuel cells for automotive applications, and more particularly to the rejuvenation of proton exchange membrane fuel cells ("PEMFCs") used in these automotive applications.

BACKGROUND OF THE INVENTION

Automotive proton exchange membrane fuel cells ("PEMFCs") (a fuel cell used in, for example, an automobile, truck, or other moving vehicle) must meet the needs of a varying dynamic load. During normal operation, the potential of an anode of an automotive PEMFC will be near the reversible hydrogen potential but the cathode potential will vary as the potential of the PEMFC changes to match the variable power demands that are placed on the PEMFC. A typical electrode of an automotive PEMFC includes a metallic electro-catalyst such as nanoparticles of a noble metal (e.g. platinum) supported on carbon and an ionomer binder (e.g. a perfluorinated polymer such as a NAFION polymer). Under dynamic PEMFC operating conditions, the cathode performance can deteriorate. The dynamic conditions generally involve an electrical potential that swings from a low value to a high value and back again. At high values of the potential, nanoparticles of platinum catalyst at the cathode dissolve rapidly. The dissolved nanoparticles of platinum may precipitate as larger sized particles of platinum. Trading the smaller sized nanoparticles of platinum for larger sized particles of platinum reduces the active surface area of the cathode catalyst, which brings with it a gradual degradation of the fuel cell electrode(s) and, consequently, deterioration in fuel cell performance. At low values of potential, water generated by the oxygen reduction reaction of the cathode increases the hydrophilicity of the catalyst layer. The increased hydrophilicity of the catalyst layer tends to inhibit facile gas transport. Furthermore, ionomer binder undergoes long-term relaxation process in the presence of water, which can change the initial optimized three—phase interface (catalyst, ionomer and catalyst supporting materials). The problems associated with a reduction in surface area of the electrocatalyst in combination with problems brought on by water generation are believed to facilitate the degradation of the PEMFC, resulting in deterioration of fuel cell performance.

The US DOE EERE ("United States Department of Energy Office of Energy Efficiency and Renewable Energy") has developed a PEMFC engine drive cycle tests that are intended to simulate the performance degradation of PEMFCs in automotive applications. These tests typically involve cycling the power density continuously from low values to high values. Table 1 summarizes voltages and their associated duration for a drive cycle profile suggested by the US DOE EERE. In such a DOE test protocol, the performance of fuel cells for vehicular applications can be assessed and compared with a U.S. DOE performance target

TABLE 1

| Step | Duration (in seconds) | Voltage (in volts) |
|---|---|---|
| 1 | 15 | Open circuit voltage |
| 2 | 25 | 0.8 |
| 3 | 20 | 0.75 |
| 4 | 15 | 0.88 |
| 5 | 24 | 0.80 |
| 6 | 20 | 0.75 |
| 7 | 15 | 0.88 |
| 8 | 25 | 0.80 |
| 9 | 20 | 0.75 |
| 10 | 15 | 0.88 |
| 11 | 35 | 0.80 |
| 12 | 20 | 0.60 |
| 13 | 35 | 0.65 |
| 14 | 8 | 0.88 |
| 15 | 35 | 0.75 |
| 16 | 40 | 0.88 |

This protocol was not intended to simulate everything that can happen to an automotive fuel cell during normal operating conditions. For example, the protocol does not simulate fuel cell behavior under start/stop conditions. However, such a protocol may provide valuable insight about fuel cell durability for automotive-type transients.

The US Council for Automotive Research (USCAR) also has developed accelerated stress tests (ASTs) and polarization protocols for PEMFC to shorten the time required to address durability issues for all drive cycles. An exemplary AST for a cathode expected to be used for an automotive application consists of a triangle sweep cycle at 50 mV/sec between 0.6 V to 1.0 V for 30,000 cycles (16 seconds per sweep) for a PEMFC operating at a temperature of 80° C. with the anode flowing hydrogen gas at 100% relative humidity and the cathode flowing nitrogen gas at 100% relative humidity. The test is meant to simulate the performance of an automotive PEMFC operating in an automobile or other vehicle over the 5,000 hours of fuel cell drive time. Polarization curves are recorded at intervals during the potential cycling in order to follow the performance of the PEMFC.

SUMMARY OF THE INVENTION

To achieve the foregoing and other objects, and in accordance with the purposes of the present invention, as embodied and broadly described herein, a process for increasing the current density at a chosen cell voltage for a fuel cell. The process includes providing a fuel cell comprising an anode, a cathode, and a polymer electrolyte membrane between the anode and the cathode, the cathode comprising a current density at a chosen cell voltage, allowing the fuel cell to generate electricity over a chosen period of time during which the current density at the chosen cell voltage decreases to a value indicative of sudden performance loss. The process also includes dehydrating the fuel cell, and thereafter exposing the cathode to a flow of a dry gas under conditions suitable to mitigate the current density deterioration at the given cell voltage, thereby rejuvenating the fuel cell.

The performances of the cells before the first cycle and after periods of 10,000 and 30,000 cycles are included in each graph.

Figure 2:
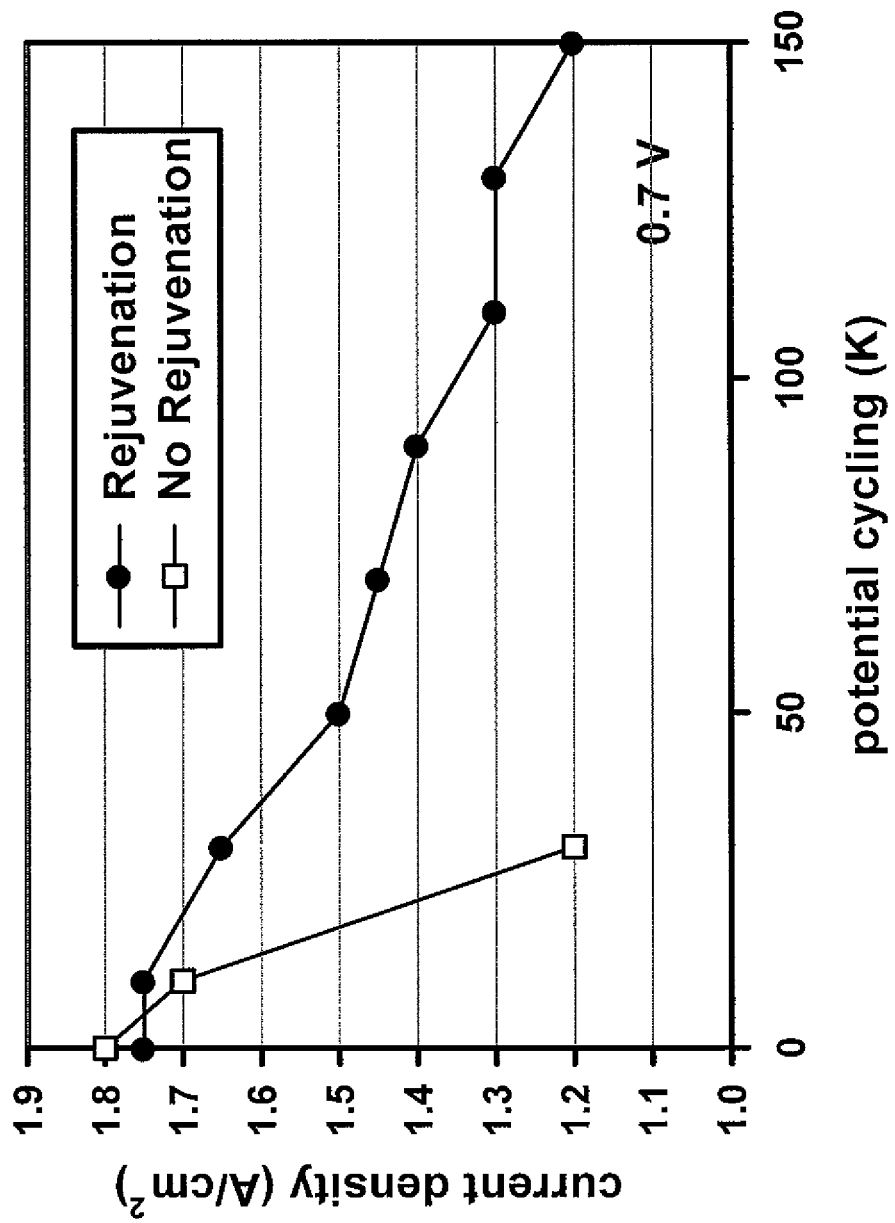

FIG. 2 provides a graph of current density at 0.3 V collected while performing accelerated stress tests on a fuel cell with rejuvenation after periods of 20,000 cycles (filled circles), and on another fuel cell without rejuvenation (unfilled squares).

FIG. 3a through FIG. 3d show graphs of voltage versus current density for accelerated stress tests performed on fuel cells at 80° C. The temperatures above each graph indicate the treatment temperature, not the cycling temperature. Each graph includes three plots, one at the first cycle (solid line), after 10,000 cycles (longer dashed lines), and after 30,000 cycles (shorter dashed lines).

Figure 4:
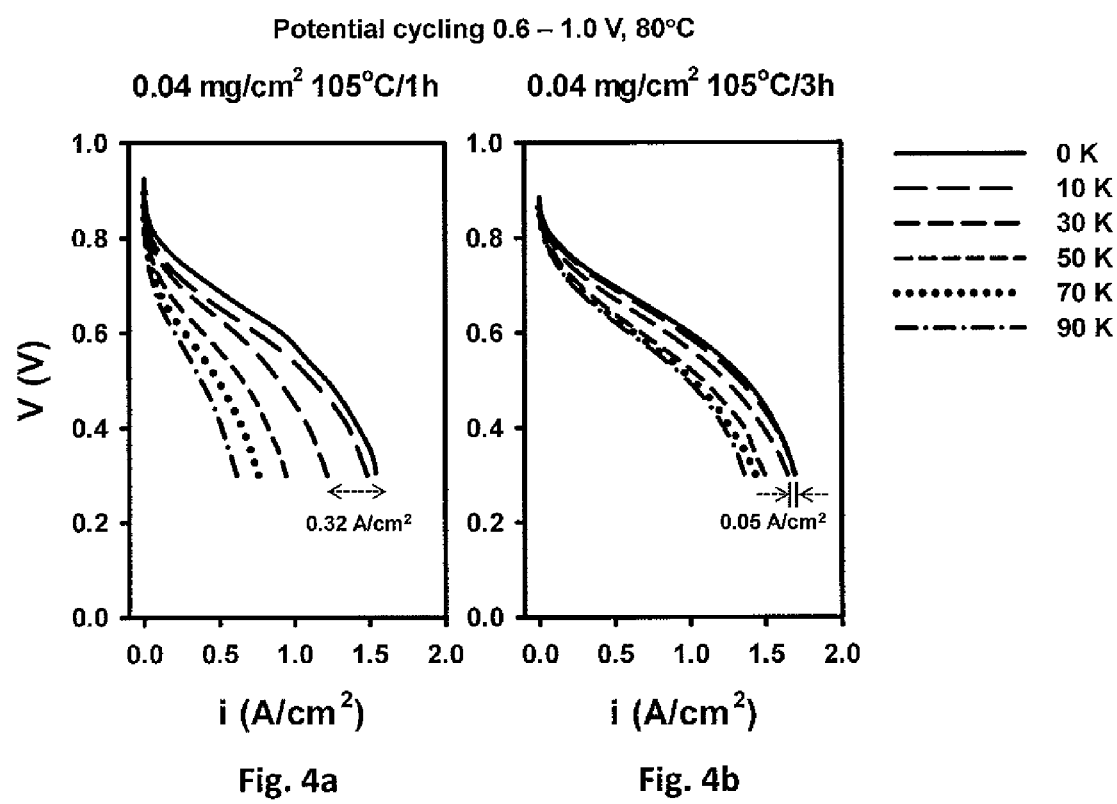

FIG. 4 graphically compares embodiment treatments for 1 hour treatment time versus 3 hour treatment time for fuel cells operating under conditions of accelerated stress tests (DOE protocols, 0.6V to 1.0V at 80° C.). FIG. 4a indicated more of a difference in current density (0.32 A/cm$^2$) than FIG. 4b (0.05 A/cm$^2$) after 30,000 cycles, demonstrating the advantages of a longer treatment time.

FIG. 5a-b graphically illustrates the effects of the embodiment rejuvenation process on the catalyst particle growth, namely that particles grow more slowly after rejuvenation. The y-axis is electrochemical surface area ("ECSA") of platinum particles. FIG. 5a shows the effect of treatment temperature and FIG. 5b shows the effect of treatment time.

DETAILED DESCRIPTION

Embodiments relate to minimizing sudden performance loss of PEMFCs by periodic treatment of fuel cell electrodes, particularly cathodes, with dry gas. This treatment is believed to have an effect on ionomer morphology that rejuvenates, at least partially, the mechanical integrity of the electrodes. The nature of the dry gas, treatment temperature, and duration of the treatment are described below.

Figure 1:
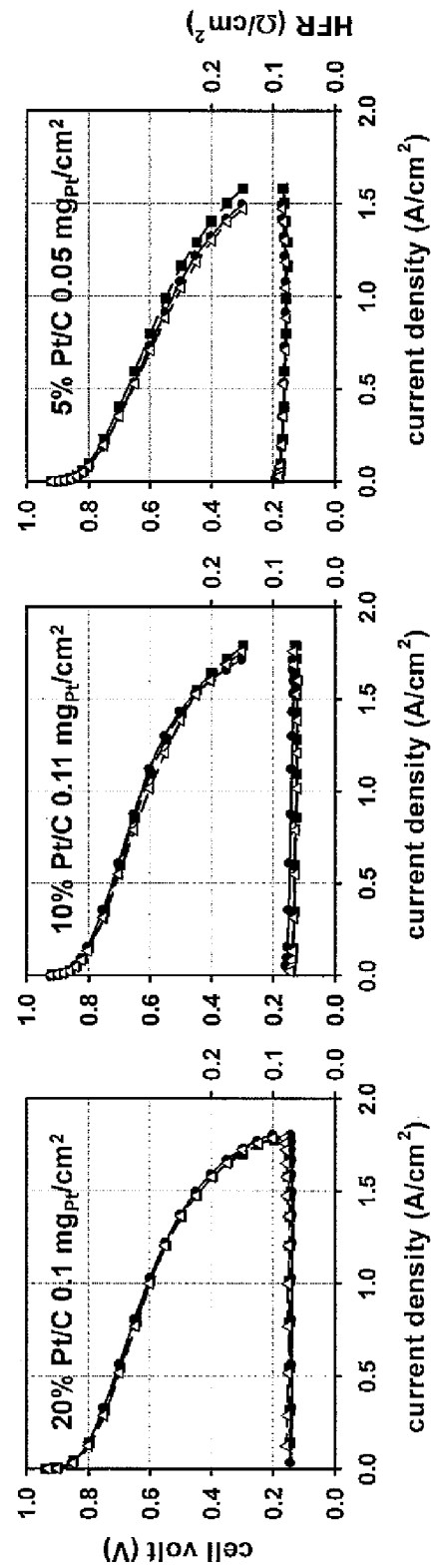
FIG. 1a through FIG. 1f provides graphs of cell voltage versus current density for PEMFC cathodes subjected to accelerated stress tests employing DOE protocols of a triangle sweep cycle at 50 mV/sec between 0.6 V to 1.0 V.
Figure 1:
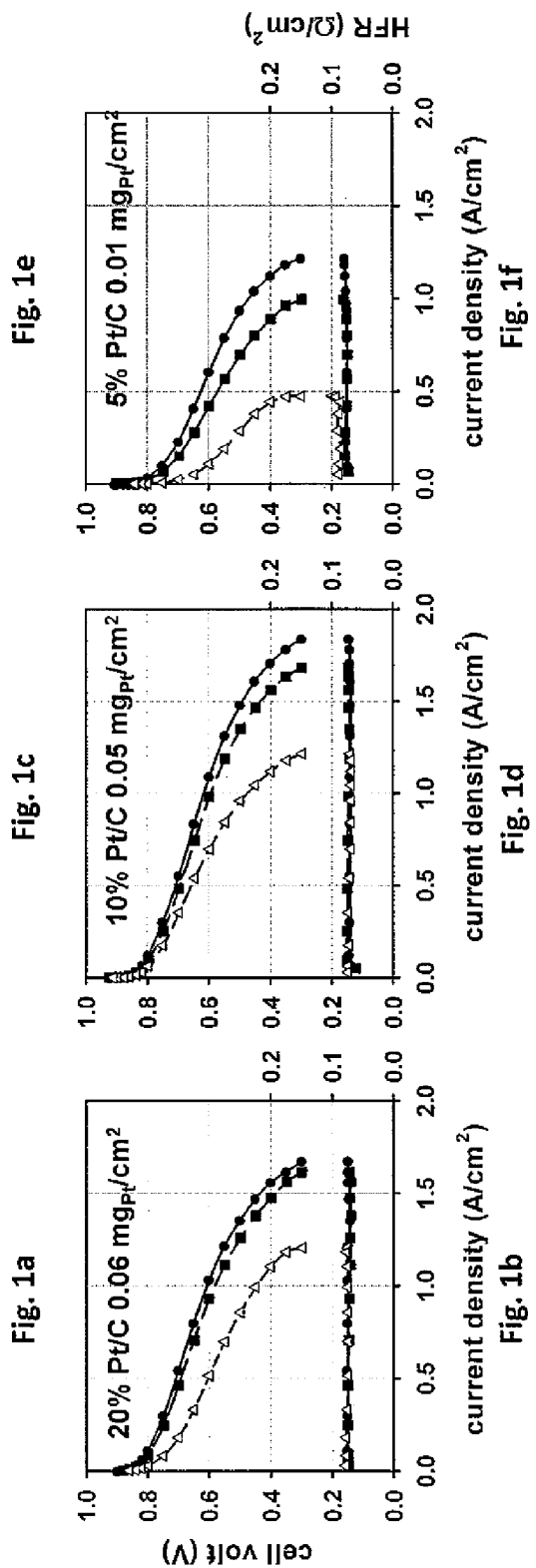

FIG. 1a through 1f provides graphs of cell voltage versus current density for cathodes of PEMFCs subjected to accelerated stress tests according to DOE protocols. FIG. 1a: 20% Pt/C with a loading of 0.1 mg Pt per cm$^2$, cathode thickness: 8 μm; FIG. 1b: 20% Pt/C with loading of 0.06 mg Pt per cm$^2$, cathode thickness: 4 μm; FIG. 1c: 10% Pt/C with a loading of 0.11 mg Pt per cm$^2$, cathode thickness: 14 μm; FIG. 1d: 10% Pt/C with a loading of 0.05 mg Pt per cm$^2$, cathode thickness: 6 μm; FIG. 1e: 5% Pt/C with a loading of 0.05 mg Pt per cm$^2$, cathode thickness: 14 μm; and FIG. 1f: 5% Pt/C with a loading of 0.01 mg Pt per cm$^2$, cathode thickness: 2 μm. Each graph displays results of cell performance before the initial cycle (filled circles), after 10,000 cycles (filled squares), and after 30,000 cycles (unfilled triangles). A comparison of the test results indicates that the cathode performance shown in FIGS. 1a, 1c, and 1e did not change significantly even after 30,000 cycles. By contrast, cathode performance shown in FIGS. 1b and 1d, and 1f degraded significantly after 30,000 cycles. It is believed that FIG. 1 teaches that fuel cell performance is related to electrode thickness. For example, the results indicate that the fuel cell electrodes having thickness less than 8 μm are subject to a sudden performance loss during the 30,000 potential cycles. It is believed that this sudden performance loss, which is evident from the significant loss of current density during a period of 30,000 cycles, is due to water generation from the oxygen reduction reaction ("ORR"). The impact of water generation on the structure of the electrode may be explained in terms of electrode thickness:

During a dynamic load, the current density changes. A certain amount of water is generated at a chosen current density. Thicker electrodes can distribute this water throughout the ionomer very quickly, but thinner electrodes cannot because thinner electrodes have fewer pores and less ionomer than thicker electrodes for holding the water. This results in an increase in capillary water pressure in the pores and ionomer. The increase in capillary pressure may alter the electrode structure.

Sudden performance loss may be delayed (but not indefinitely) by providing automotive PEMFCs with very thick platinum-containing electrodes and a very high loading of platinum (e.g. see FIG. 1a). Unfortunately, platinum is very expensive, so this is not an economically viable approach of solving the problem of avoiding or at least minimizing the problem of sudden performance loss.

Based upon a cursory examination of FIG. 1e, one might consider avoiding or minimizing sudden performance loss by providing automotive PEMFCs with cathodes having a relatively low Pt to C ratio (5% Pt/C) and a low overall platinum loading (0.05 mg per cm$^2$) of nanoparticles of platinum. This approach, however, provides an electrode that would likely suffer from problems related to electrical discontinuity between the active catalyst nanoparticles because the density of the active catalyst particles is very low. Such a low nanoparticle density would lead to electrical discontinuity between particles, resulting in poor initial electrode performance, which can be seen with FIG. 1d and FIG. 1e (a comparison of the initial performance sections of FIGS. 1d and 1e, at 0.6 V reveals the following: the current density of FIG. 1d was 1.1 A/cm$^2$ while the current density of FIG. 1e was less than 0.8 A/cm$^2$ (more than 25% less). This difference is significant, particularly since the catalyst loadings were identical).

Our solution to the problem of minimizing the effects of sudden performance loss in platinum-based electrodes for automotive PEMFCs is a rejuvenation process that effectively reverses the effects of sudden performance loss, thereby maintaining the performance of an automotive PEMFC at a higher level of performance than would be possible otherwise. The rejuvenation process may be applied to an automotive periodically to maintain a higher level of performance to minimize the effects of sudden performance loss. The process is relatively simple to do, and involves dehydration of the cathode and exposure to a dry flowing gas for a suitable period of time at a suitable temperature. Afterward, the PEMFC may be used as it was before employing the rejuvenation process to the PEMFC.

An embodiment rejuvenation process provides advantages that include extending the operating lifetime of an automotive PEMFC at a high level of performance.

A description of a non-limiting embodiment of treatment that results in rejuvenation of a PEMFC was demonstrated during an accelerated stress test. The stress test was applied to the PEMFC to simulate 5,000 hours of operation. The stress test was applied to a PEMFC having a membrane electrode assembly ("MEA") of NAFION NR-212 ionomer with approximately 0.2 mg/cm$^2$ of platinum (20% Pt on carbon) loaded on the anode side and a 0.04-0.05 mg/cm$^2$ platinum (10% Pt on carbon, electrode thickness: 2-3 micrometers ('μm')) load on the cathode side. The MEA was prepared by casting a suspension of catalytic suspension onto each side of a NAFION NR-212 ionomer membrane. Glycerol was used as the casting solvent—glycerol was mixed with commercial NAFION dispersion that contained water, isopropanol, and n-propanol resulting in a suspension. Most of the liquid, however, was glycerol. The MEA was placed in a fuel cell. The resulting PEMFC was subjected to an AST, according to DOE protocols, for 20,000 cycles. After 20,000 cycles were performed, the PEMFC was dehydrated using a high flow rate of nitrogen gas (about 500 sccm). It should be noted that dehydration is a common practice used in fuel cell testing—at the conclusion of the dehydration step, the temperature of the fuel cell decreases, which may result in condensation of water vapor.

After the dehydration step, the anode and cathode of the PEMFC were exposed to flow of dry nitrogen for 3 hours at a temperature of 105° C.

After the step of exposing the electrodes to the gas at the elevated temperature (above the fuel cell operating temperature), the PEMFC was then rehydrated and operated at normal conditions. Polarization curves were generated before and after in order to monitor PEMFC performance. Cyclic voltammetry was also performed to monitor the catalyst electrochemical surface area. The rejuvenation process was repeated every 20,000 cycles until the current density reached a value of approximately 1.2 Amps/cm$^2$. This periodic treatment of dehydration, exposure to flowing dry gas at elevated temperature above the cell operating temperature, followed by rehydration resulted in rejuvenation of the PEMFC and an extension of the operating lifetime. The current density in amperes per square centimeter is plotted against the number of cycles in FIG. 2. Also plotted are results obtained for a PEMFC prepared in the same fashion but not subjected to the rejuvenation process. As FIG. 2 shows, without the rejuvenation process, the current density reached this value of 1.2 amps/cm$^2$ after 30,000 cycles, which is the equivalent of an automotive PEMFC operating for about 5,000 hours. With the embodiment rejuvenation process, 150,000 cycles were needed to reach this same value of current density, which is the equivalent of the same automotive PEMFC operating for about 25,000 hours.

A gas suitable for the present rejuvenation process should be dry (i.e. free of water) because exposure to water at elevated temperatures will disintegrate the electrode structure. Suitable dry gases include but are not limited to dry nitrogen gas and dry air. Suitable dry gas is a gas having less than 5% water, preferably less than 3% water, more preferably less than 2% water, more preferably less than 1% water. The dry gas most preferably has as little water in the gas as possible.

Figure 3:
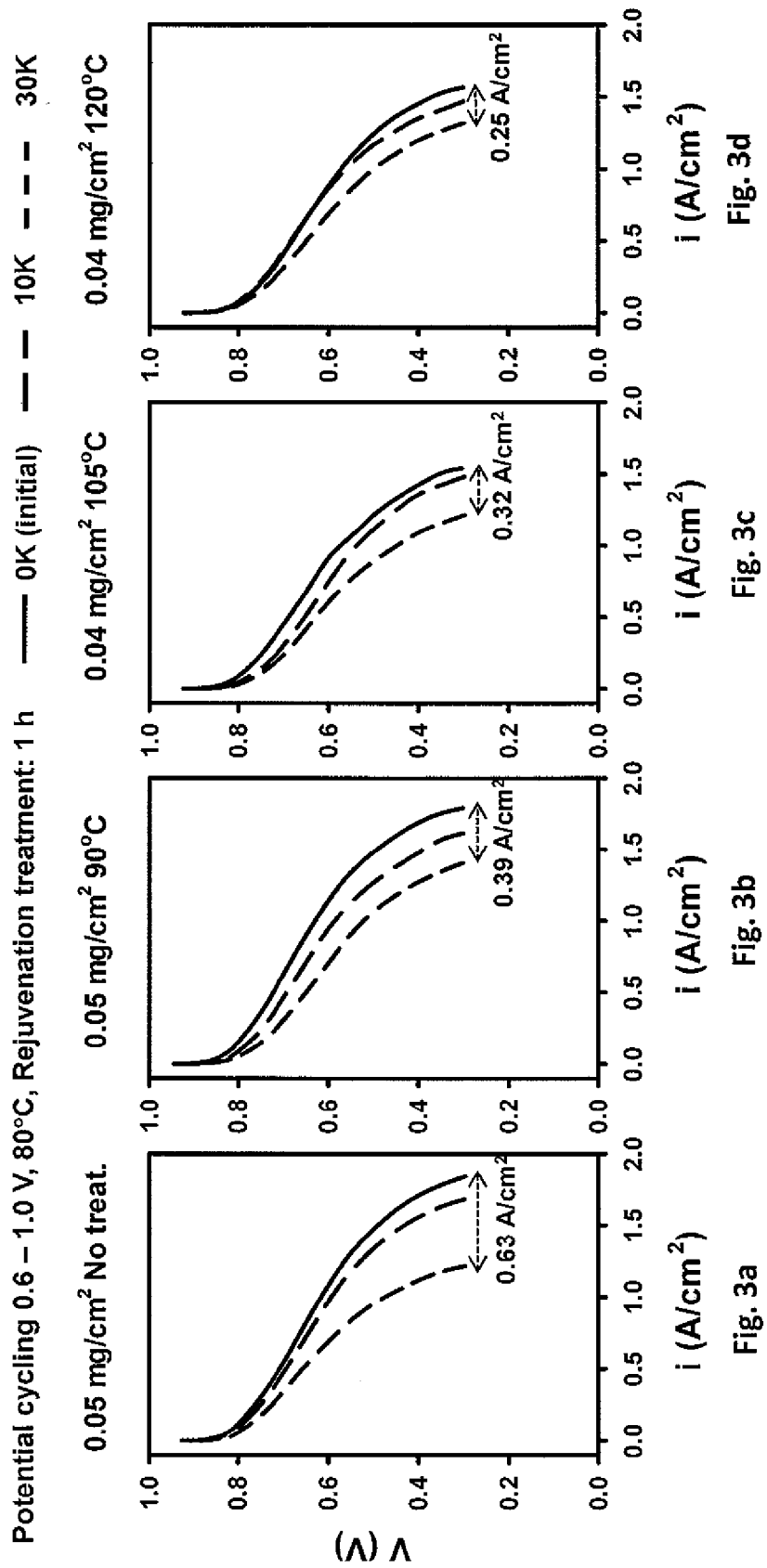

An embodiment treatment is typically performed at a temperature, or within a temperature range, that is higher than the fuel cell operating temperature in order to restore electrode performance (i.e. improve the current density at a chosen voltage). The effect of temperature on an embodiment rejuvenation process was examined during stress tests applied to PEMFCs. The cathodes (0.04 or 0.05 mg platinum on carbon) were rejuvenated for one hour after 10,000 cycles from 0.06V to 1.0V at a cell temperature of 80° C., and after 30,000 cycles under the same conditions. Values were also obtained before the first cycle. The graphs of the results are shown in FIG. 3. FIGS. 3b, 3c, and 3d provides graphs of data that illustrate the effects of treatment at a temperature in a range of 90° C. to 120° C.—all of these rejuvenations employed temperatures higher than the cell temperature during the cycling (80° C.). For comparison, FIG. 3a provides a graph of data for a fuel cell that did not undergo an embodiment treatment rejuvenation process. The results indicated by the graphs show that rejuvenation at the highest temperature (i.e. 120° C.) provided the highest increase in electrode durability (i.e. the current density was closer to the initial value after rejuvenation at 120° C. compared to rejuvenation at 90° C., although there was significant improvement obtained at a rejuvenation temperature of 90° C.).

It is believed that temperatures higher than 120° C. may improve the durability further, but the use of higher temperatures should be balanced against the risk of thermal degradation/oxidation of the fuel cell assembly component.

FIG. 4 compares results from embodiment treatments (1 hour versus 3 hour treatment time) for PEMFCs with identical cathodes (0.04 mg/cm$^2$ platinum) at identical rejuvenation temperatures (105C) fuel cells operating under conditions of accelerated stress tests (DOE protocols, 0.6V to 1.0V at 80° C.). FIG. 4a provides graphical data for 1 hour rejuvenation time. FIG. 4b provides graphical data for a three hour rejuvenation time. FIG. 4 a and FIG. 4b show that a longer rejuvenation time resulted in further improvement of the current density for a given voltage.

Figure 5:
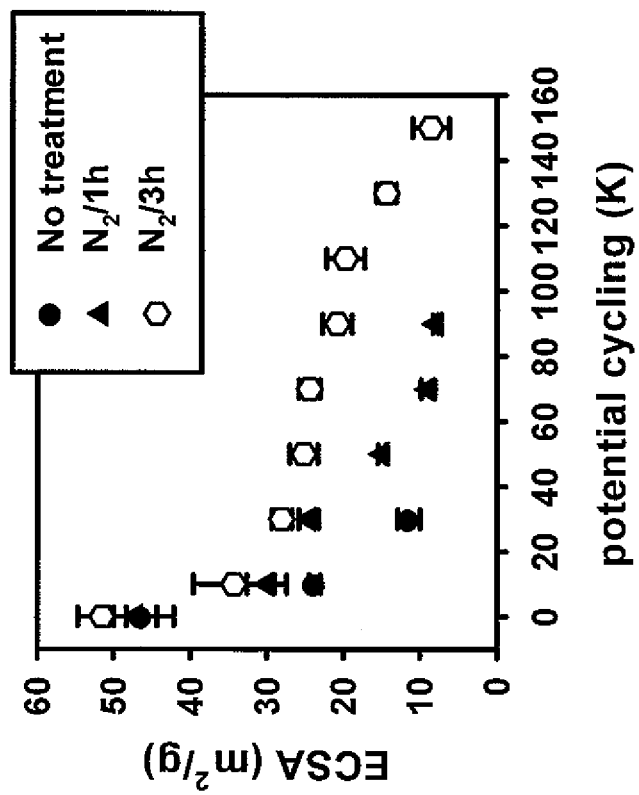
Figure 5:
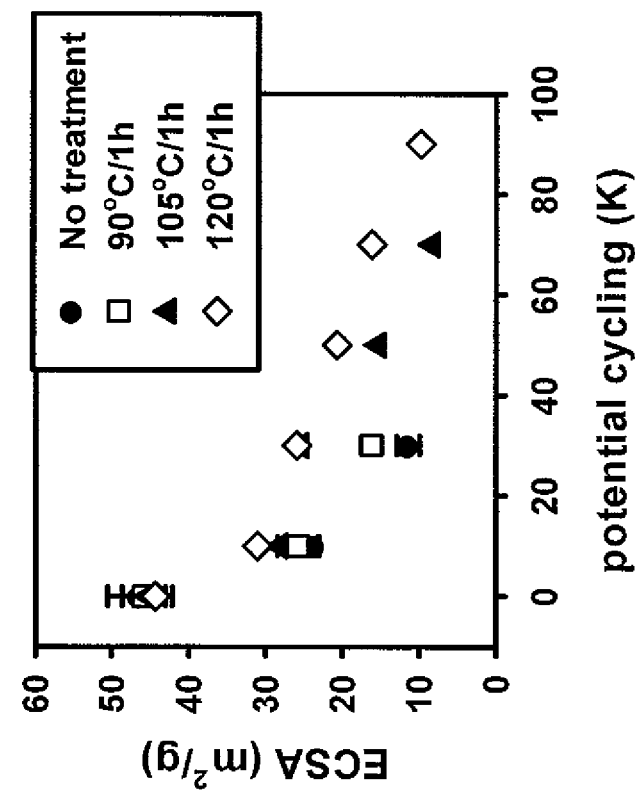

The rejuvenation process also can prevent rapid growth of platinum nano-particles. FIG. 5 shows the electrochemical surface area (ECSA) change of platinum nano-particles during potential cycles. ECSA was measured by cyclic voltammetry of the fuel cell cathodes using a potentiostat. FIG. 5a shows the loss of ECSA of platinum in the cathode is less significant when higher rejuvenation temperatures are used. FIG. 5b shows that the rejuvenation duration (treatment time) also impact the ECSA change. This evidence suggests that by employing the rejuvenation process, the electrode structure becomes more resistant to platinum dissolution and aggregation.

Without wishing to be bound by any theory or explanation, the sudden performance loss of PEMFCs might be explained by a time-dependent relaxation behavior of the ionomer at the electrode under highly humidified cell operating conditions. It is believed that the ionomer structure can change under the conditions of the accelerated stress test (AST) and the rate of change may depend on various factors. Ionomer relaxation is time dependent, with a time scale that may range from a few minutes to a few years. It is believed that ionomer relaxation is accelerated in the presence of water. It is also believed that the presence of platinum, and/or carbon, slows down ionomer relaxation, while subsequent platinum particle growth and precipitation accelerates ionomer relaxation. Ionomers prepared from an alcohol based process exhibit much slower relaxation compared to ionomers prepared from water or aprotic solvent based process.

It is possible to delay the morphological change of the ionomer by using an alcohol, such as glycerol or propylene glycol, as the electrode casting solvent instead of water based liquid media (see Kim et al., "Highly durable fuel cell electrodes based on ionomers dispersed in glycerol," Phys. Chem. Chem. Phys., 2014, vol. 16, no. 13, pp. 5927-5932, incorporated by reference).

An embodiment rejuvenation process is expected to prolong the strong performance of a PEMFC. However, the life expectancy for a PEMFC, even after employing the embodiment rejuvenation process, is not expected to be indefinite. As FIG. 2 shows, sudden performance loss may be delayed using the disclosed rejuvenation process, but will occur eventually after prolonged cell operation.

The process of rejuvenation of PEMFCs applies to automotive PEMFCs with platinum-based cathodes (platinum can be elemental platinum or an alloy of platinum) having a thickness of from 0.1 micrometers to 15 micrometers, preferably from 1 micrometer to 8 micrometers. The process of rejuvenation applies to cathodes comprised of platinum, carbon black, and ionomer. The process applies to cathodes having a ratio of platinum to carbon of from about 40 weight percent to about 1 weight percent. The process applies to the rejuvenation of PEMFCs having cathodes having a loading of less than 0.20 milligrams of platinum per square centimeter.

The process of the rejuvenation of PEMFCs applies to automotive PEMFCs having cathodes comprising a ratio of platinum to carbon of from about 20 weight percent to about 5 weight percent, the cathode further comprising a loading of less than 0.1 milligrams of platinum per square centimeter.

The process of rejuvenation of PEMFCs employs rejuvenation treatment temperatures in a range of from about 80° C. to about 200° C., preferably 90° C. to 180° C., more preferably 105° C. to 180° C.

The process of rejuvenation of PEMFCs, which applies to rejuvenation of automotive PEMFCs, includes exposing the PEMFC, particularly the cathode, to a dry gas at the aforementioned elevated temperatures, for a duration of from about 10 minutes to about 10 hours, preferably for a duration of from about 30 minutes to about 3 hours.

In summary, a process for rejuvenating automotive fuel cells which involves dehydrating a fuel cell and exposure to a hot dry gas may be applied to the fuel cell in situ and has been shown to improve the durability of the polymer electrolyte for polymer electrolyte membrane fuel cells. It is believed that an embodiment process rejuvenates the fuel cell by reversing, at least partially, electrode ionomer relaxation. The treatment is believed to restore, at least partially, the ionomer morphology, which reverses the effects of a sudden performance loss due to ionomer relaxation. The method is simple to apply, may be applied in situ, and allows a fuel cell to maintain strong performance for an extended period of time.

Although the disclosed rejuvenation process was demonstrated for fuel cells during accelerated stress tests, the disclosed rejuvenation process it is expected to be effective for prolonging a strong performance in fuel cells such as automotive fuel cells that have been operating for extended periods of time (i.e. for years), and is also expected to be useful for rejuvenating any fuel cell, particularly for cells containing thin film electrodes having a thickness of less than about 10 micrometers with a relatively low loading of platinum based catalysts (platinum on carbon, for example).

The foregoing description of the invention has been presented for purposes of illustration and is not intended to be exhaustive or to limit the invention to the precise form disclosed, as modifications and variations are possible with respect to the above teaching. It is intended that the scope of the invention be defined by the claims appended hereto.

Although the present invention has been described with reference to specific details, it is not intended that such details should be regarded as limitations upon the scope of the invention, except as and to the extent that they are included in the accompanying claims.

What is claimed is:

1. A process for rejuvenating a fuel cell, the process comprising:
    providing a fuel cell having an anode, a cathode, and a polymer electrolyte membrane between the anode and the cathode, the cathode having an initial value of current density at a chosen cell voltage;
    allowing the fuel cell to generate electricity over a chosen period of time after which the cathode has a second value of current density less than the initial value at the same chosen voltage, a difference between the initial value and the second value over the chosen period of time representing a rate of performance loss;
    dehydrating the fuel cell; and thereafter
    exposing the cathode to a flow of a gas having less than 5% water at a temperature of from about 80° C. to about 200° C.; and
    rehydrating the fuel cell, wherein the sequence of dehydration, gas exposure, and rehydration rejuvenates the fuel cell as indicated by an increase in the current density from the second value to a third value following rehydration.

2. The process of claim 1, wherein the cathode thickness is from 0.1 μm to 15 μm.

3. The process of claim 2, wherein the cathode thickness is from 1 μm to 8 μm.

4. The process of claim 1, wherein the cathode includes platinum, carbon black, and ionomer, the platinum is present at a platinum to carbon ratio of from about 40 wt % to about 1 wt %, and the cathode includes a platinum loading value of less than 0.20 mg/cm².

5. The process of claim 4, wherein the cathode includes:
    a ratio of platinum to carbon of from about 20 wt % to about 5 wt %, and
    a platinum loading value of less than 0.1 mg/cm².

6. The process of claim 1, wherein the temperature is in a range of 105° C. to 180° C.

7. The process of claim 4, wherein the platinum is selected from elemental platinum or an alloy of platinum.

8. The process of claim 1, wherein the gas having less than 5% water includes nitrogen gas, helium gas, argon gas, or air.

9. The process of claim 1, wherein the step of exposing the cathode to the flow of the gas further includes exposing the cathode to the gas over an exposure time of from about 10 minutes to about 10 hours.

10. The process of claim 9, wherein the exposure time is from about 30 minutes to about 3 hours.

* * * * *